(12) United States Patent  
Neubauer

(10) Patent No.: US 12,252,010 B2  
(45) Date of Patent: Mar. 18, 2025

(54) ELECTRIC MACHINE ARRANGEMENT AND VEHICLE AXLE

(71) Applicant: Schaeffler Technologies AG & Co. KG, Herzogenaurach (DE)

(72) Inventor: Benedikt Neubauer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 18/280,979

(22) PCT Filed: Feb. 8, 2022

(86) PCT No.: PCT/DE2022/100109  
§ 371 (c)(1),  
(2) Date: Sep. 8, 2023

(87) PCT Pub. No.: WO2022/188914  
PCT Pub. Date: Sep. 15, 2022

(65) Prior Publication Data  
US 2024/0171038 A1 May 23, 2024

(30) Foreign Application Priority Data  
Mar. 8, 2021 (DE) .................... 10 2021 105 448.6

(51) Int. Cl.  
*B60K 17/16* (2006.01)  
*B60K 1/00* (2006.01)  
(Continued)

(52) U.S. Cl.  
CPC .......... *B60K 17/165* (2013.01); *H02K 7/006* (2013.01); *B60K 2001/001* (2013.01);  
(Continued)

(58) Field of Classification Search  
CPC .......... B60K 17/165; B60K 2001/001; H02K 7/006; H02K 7/116; F16H 57/021; F16H 48/10–11  
See application file for complete search history.

(56) References Cited

U.S. PATENT DOCUMENTS

| 5,845,732 A | 12/1998 | Taniguchi et al. |
| 6,378,638 B1 * | 4/2002 | Mizon .................... B60K 6/365  475/221 |

(Continued)

FOREIGN PATENT DOCUMENTS

| CN | 112081883 A | 12/2020 |
| DE | 102005055690 A1 | 5/2007 |

(Continued)

*Primary Examiner* — James J Taylor, II  
(74) *Attorney, Agent, or Firm* — Volpe Koenig

(57) ABSTRACT

An electric machine arrangement including an electric machine which is designed as a radial flux machine having an inner rotor and which has a stator and a rotor, and a transmission arrangement which can be driven by the rotor. The transmission arrangement being arranged, at least in regions, in a receiving space formed within the rotor. The transmission arrangement has a first sub-transmission designed as a reducing stage for reducing the rotational speed and a second sub-transmission designed as a differential gear.

14 Claims, 3 Drawing Sheets

(51) Int. Cl.
*F16H 48/11* (2012.01)
*F16H 57/021* (2012.01)
*H02K 7/00* (2006.01)
*H02K 7/116* (2006.01)

(52) U.S. Cl.
CPC ............ *F16H 48/11* (2013.01); *F16H 57/021* (2013.01); *H02K 7/116* (2013.01)

(56) References Cited

U.S. PATENT DOCUMENTS

| | | | |
|---|---|---|---|
| 6,484,834 B2 * | 11/2002 | Bowen | B60L 50/16 |
| | | | 903/910 |
| 7,442,141 B2 * | 10/2008 | Yamauchi | B60L 50/52 |
| | | | 475/6 |
| 7,743,859 B2 * | 6/2010 | Forsyth | B62D 59/04 |
| | | | 303/146 |
| 2013/0274050 A1 | 10/2013 | Kalmbach et al. | |

FOREIGN PATENT DOCUMENTS

| | | | | |
|---|---|---|---|---|
| DE | 102010048837 A1 | 4/2012 | | |
| DE | 102016216802 B3 | 2/2018 | | |
| DE | 102012016508 B4 * | 3/2022 | ............. | F16H 48/36 |

* cited by examiner

ELECTRIC MACHINE ARRANGEMENT AND VEHICLE AXLE

CROSS-REFERENCE TO RELATED APPLICATIONS

This application is the U.S. National Phase of PCT Appln. No. PCT/DE2022/100109, filed Feb. 8, 2022, which claims the benefit of German Patent Appln. No. 102021105448.6, filed Mar. 8, 2021, the entire disclosures of which are incorporated by reference herein.

TECHNICAL FIELD

The present disclosure relates to an electric machine arrangement, comprising an electric machine, designed in particular as a radial flux machine with an inner rotor and having a stator and a rotor, and a transmission arrangement that can be driven via the rotor, the transmission arrangement being arranged at least in regions in a receiving space formed within the rotor. Furthermore, the disclosure relates to a vehicle axle for an electrically driven motor vehicle.

BACKGROUND

DE 10 2010 048 837 A1 discloses a drive device having at least one electric motor and at least one planetary differential that can be driven by a rotor of the electric motor, the planetary differential having at least one planetary carrier that is operatively connected to a rotor of the electric motor, first planetary gears and second planetary gears, which are rotatably mounted on the planetary carrier, and a first sun gear and a second sun gear, each of which is operatively connected to an output shaft of the planetary differential. The first planetary gears mesh with the first sun gear and each of the second planetary gears meshes with the second sun gear and with one of the first planetary gears. Furthermore, the sun gears are arranged coaxially with an axis of rotation of the rotor.

DE 10 2016 216 802 A1 describes another drive device for a motor vehicle with a drive machine, which is operatively connected via a drive shaft to a transmission device, comprising a strain wave gearing and a differential transmission.

DE 10 2005 055 690 A1 discloses an electric machine arrangement of the type in question which has a first sub-transmission designed as a reducing stage for reducing the rotational speed and a second sub-transmission designed as a differential transmission. The first sub-transmission is designed as a two-stage planetary transmission. The differential is designed as a bevel gear differential. The housing of the differential is also the planetary carrier for a planetary stage.

SUMMARY

The object of the disclosure is that of providing an electric machine arrangement of the type in question and a vehicle axle for an electrically operated motor vehicle which is further optimized in each case with regard to its power and transmission density.

This object is achieved by an electric machine arrangement with the features of claim 1 and by a vehicle axle with an electric machine arrangement according to the disclosure.

According to the disclosure, the second sub-transmission is designed as a planetary transmission, as a result of which the greatest benefit is achieved with respect to the smallest installation space and an optimized transmission density. Furthermore, according to the disclosure, the first sub-transmission designed as a planetary transmission and the second sub-transmission designed as a planetary transmission have a common ring gear. As a result, the transmission arrangement includes an elementary minus gear set (with which the sun and ring gear rotate in opposite directions), which is used as a transmission stage, and an elementary plus gear set (where the sun and ring gear rotate in the same direction), which is used as a differential.

The electric machine arrangement according to the disclosure comprises an electric machine, designed as a radial flux machine with an inner rotor and having a stator and a rotor, and a transmission arrangement that can be driven via the rotor, the transmission arrangement being arranged at least in regions in a receiving space formed within the rotor.

First, essential elements of the claimed subject matter of the disclosure are explained in the order in which they are named in the set of claims and particularly preferred embodiments of the subject matter of the disclosure are described below.

Electric machines are used to convert electrical energy into mechanical energy and/or vice versa, and generally comprise a stationary part referred to as a stator or armature, and a part referred to as a rotor and arranged movably relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The stator of a radial flux machine usually has a cylindrical structure and generally consists of electrical laminations that are electrically insulated from one another and are structured in layers and packaged to form laminated cores. With this structure, the eddy currents in the stator caused by the stator field are kept low. Distributed over the circumference, grooves or peripherally closed recesses are embedded into the electrical lamination running parallel to the rotor shaft, and accommodate the stator winding or parts of the stator winding. Depending on the construction towards the surface, the grooves can be closed with closing elements, such as closing wedges or covers or the like, to prevent the stator winding from detaching.

A rotor is the rotating (spinning) part of an electric machine. In particular, a rotor is used when there is also a stator.

The gap between the rotor and the stator is called the air gap. In a radial flux machine, this is an annular gap with a radial width that corresponds to the distance between the rotor body and the stator body.

Further advantageous embodiments of the disclosure are specified in the dependent claims. The features listed individually in the dependent claims can be combined with one another in a technologically meaningful manner and can define further embodiments of the disclosure. In addition, the features indicated in the claims are specified and explained in more detail in the description, wherein further preferred embodiments of the disclosure are shown.

The common ring gear is particularly preferably formed in one piece and advantageously monolithic. In the context of the disclosure, a one-piece ring gear is also understood to mean a ring gear that has been joined to form one part from two different part ring gears by welding, adhesive bonding or screwing or the like, whereas a monolithic ring gear is understood to mean a part that is formed from a single blank without having any joint. Such a one-piece or monolithic ring gear also contributes to further optimization with regard to the installation space to be saved.

Advantageously, the first sub-transmission designed as a reducing stage has, in addition to the common ring gear, a set of planetary gears and a sun gear connected to the rotor in a rotationally fixed manner. This allows a further increase in the power density of the system to be achieved.

According to a further particularly preferred embodiment of the disclosure, it is possible for the second sub-transmission designed as a differential transmission, in addition to the common ring gear, to have a first set of planetary gears, a second set of planetary gears and a sun gear connected in a rotationally fixed manner to a first output shaft. Furthermore, the disclosure can also be further developed such that the planetary gears of the first planetary gear set and the planetary gears of the second planetary gear set have a common planetary carrier, the common planetary carrier being connected in a rotationally fixed manner to a second output shaft.

The first output shaft is preferably connected to the drive shaft of a first drive wheel via a further first planetary transmission and the second output shaft is connected to the drive shaft of a second drive wheel of a motor vehicle via a further second planetary transmission.

It can also be advantageous to further develop the disclosure such that the common ring gear is supported via at least one radial roller bearing and/or at least one axial roller bearing against the housing or a housing part of the electric machine or the electric machine arrangement. Alternatively, such support can also be provided without additional direct mounting of the ring gear of the transmission arrangement via roller bearings, in which case the ring gear can then be supported indirectly via the support of the planetary carriers and the sun gears of the transmission arrangement against the housing and the output shafts. Depending on the area of application of the disclosure, the mounting of further central elements of the planetary gear sets can be avoided by additional support by means of radial and/or axial roller bearings, and the power density can be further increased by the adjustment movements of the transmission elements made possible in a targeted manner thereby.

In addition, the object on which the disclosure is based is achieved by a vehicle axle, in particular a vehicle axle of an electrically driven motor vehicle, comprising an electric machine arrangement, which is implemented according to one of the preceding claims.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size relationships shown are only schematic in nature. Identical reference signs indicate the same objects, so that, where applicable, explanations from other figures can also be used.

In the Figures.

DETAILED DESCRIPTION

Figure 1:
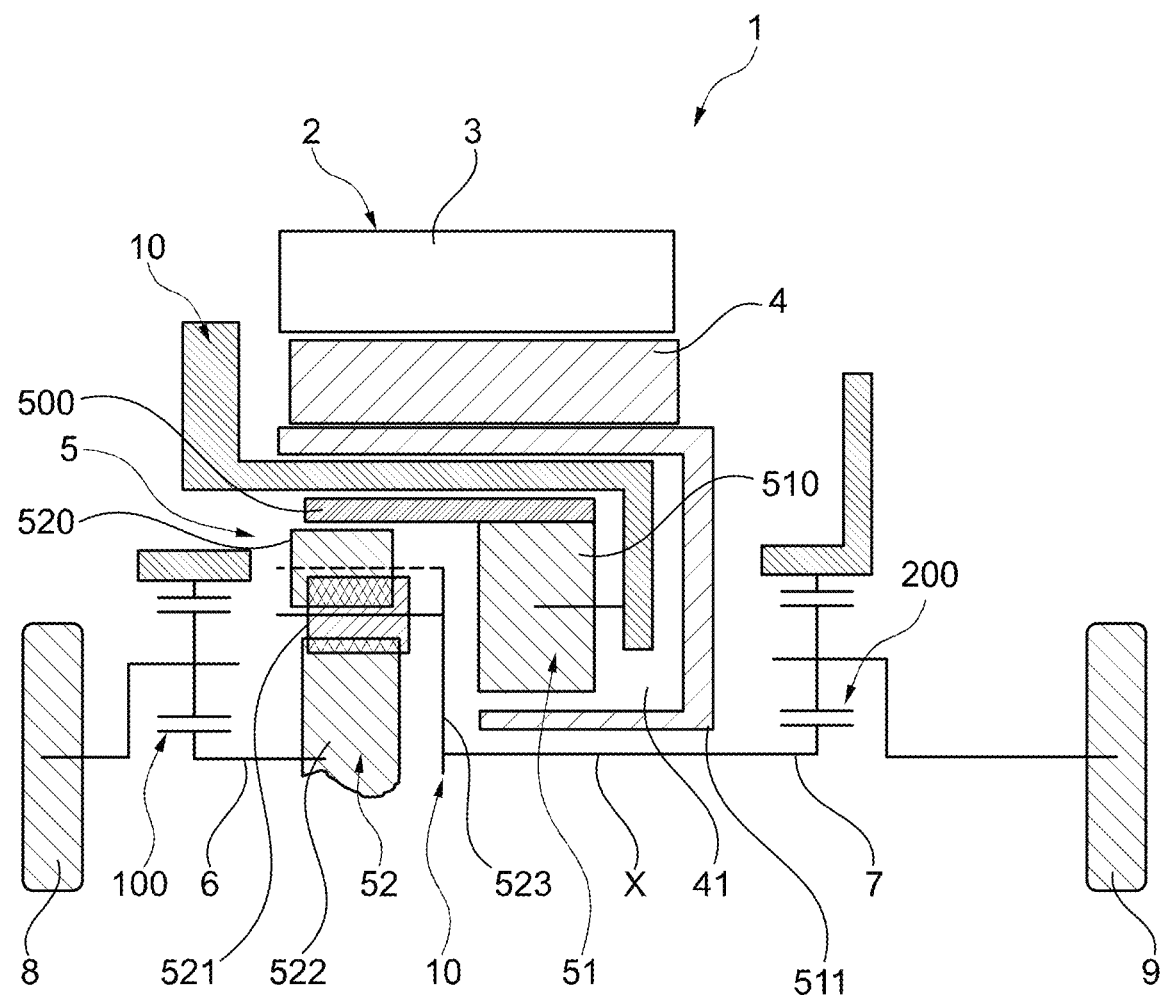
FIG. 1 shows an axial partial section of an electric machine arrangement according to the disclosure in schematic view, in a first embodiment.
Figure 2:
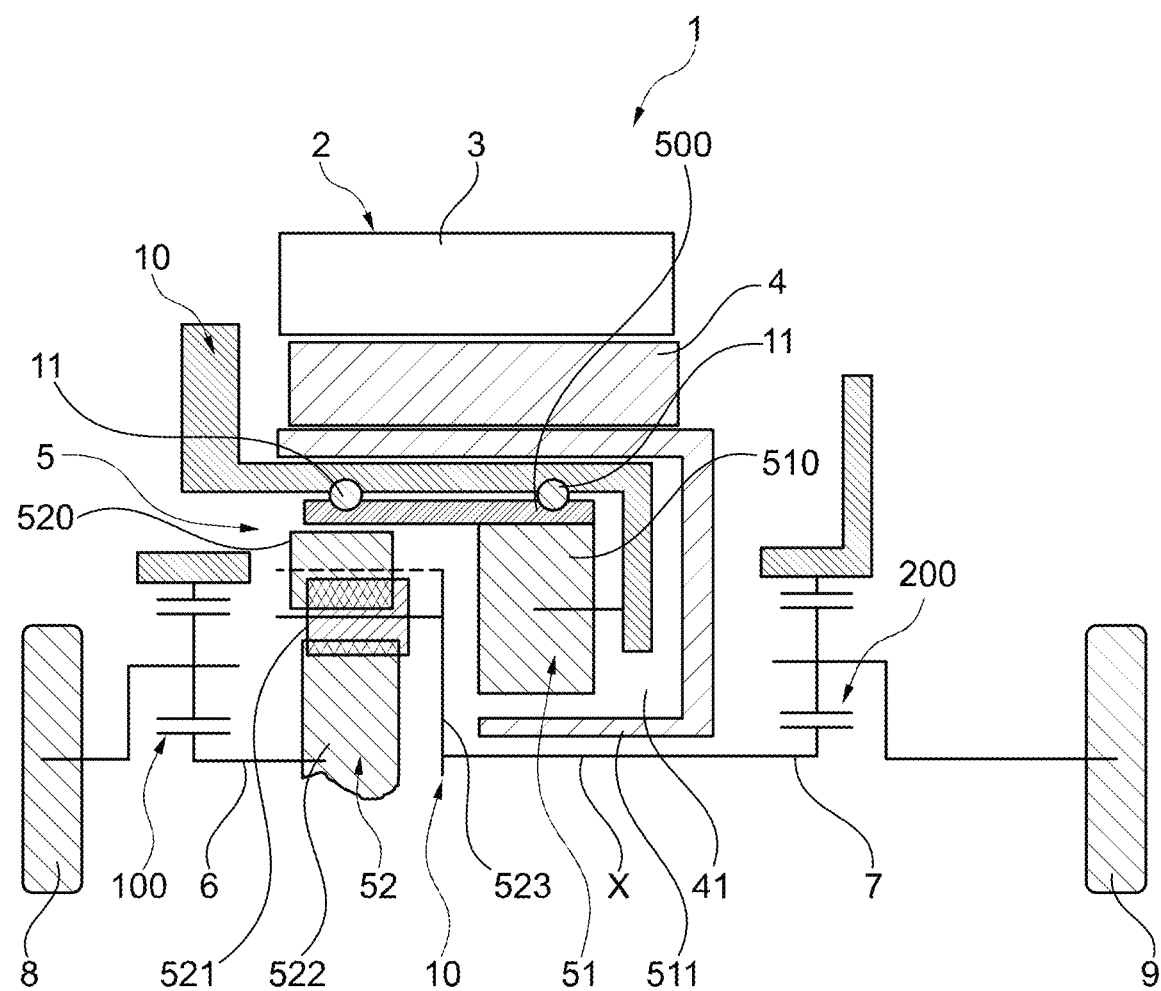
FIG. 2 shows an axial partial section of an electric machine arrangement according to the disclosure in schematic view, in a second embodiment.
Figure 3:
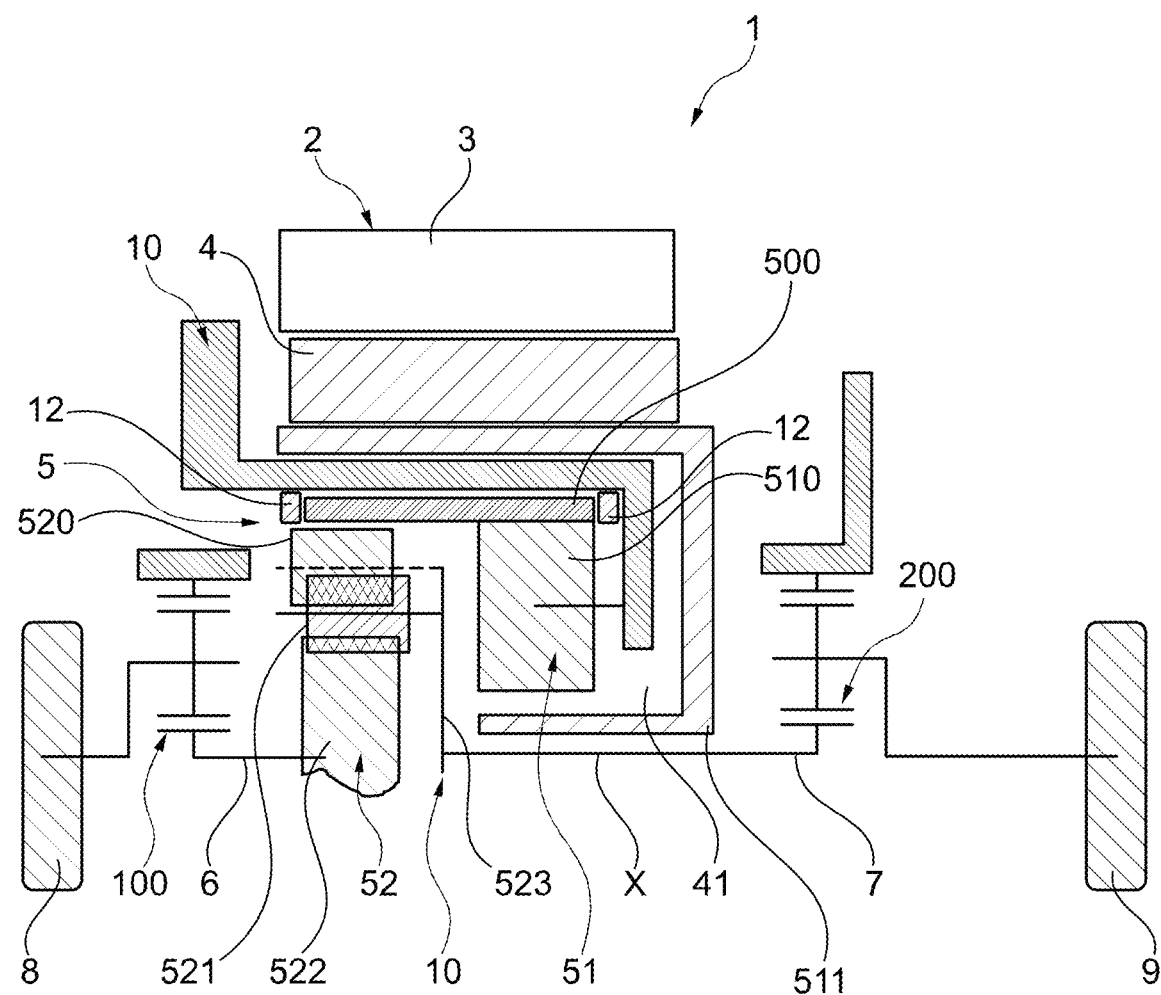
FIG. 3 shows an axial partial section of an electric machine arrangement according to the disclosure in schematic view, in a third embodiment.

FIGS. 1 to 3 each show an axial partial section of an electric machine arrangement 1 according to the disclosure in schematic view in slightly different embodiments.

The electric machine arrangement 1 shown in each case comprises an electric machine 2 designed as a radial flux machine with an inner rotor and having a stator 3 and a rotor 4, as well as a transmission arrangement 5 that can be driven via the rotor 4. The transmission arrangement 5 is arranged here completely inside a receiving space 41 formed within the rotor 4. The transmission arrangement 5 has a first sub-transmission 51 designed as a reducing stage for reducing the rotational speed n and a second sub-transmission 52 designed as a differential transmission. It can also be seen from FIG. 1 as well as from FIGS. 2 and 3 that the first sub-transmission 51 and the second sub-transmission 52 are designed as planetary transmissions and have a common ring gear 500 designed in one piece. The first sub-transmission 51 is designed as a reducing stage and, in addition to the common ring gear 500, has a set of planetary gears 510 and a sun gear 511 that is connected in a rotationally fixed manner to the rotor 4. The second sub-transmission 52 is designed as a differential transmission and, in addition to the common ring gear 500, has a first set of planetary gears 520, a second set of planetary gears 521 and a sun gear 522 connected in a rotationally fixed manner to a first output shaft 6. The planetary gears 520 of the first planetary gear set and the planetary gears 521 of the second planetary gear set share a common planetary carrier 523, the common planetary carrier 523 being connected to a second output shaft 7 in a rotationally fixed manner. The first output shaft 6 is connected via a further first planetary transmission 100 to the drive shaft of a first drive wheel 8 and the second output shaft 6 is connected via a further second planetary transmission 200 to the drive shaft of a second drive wheel 9 of a motor vehicle.

In FIG. 1, the electric machine arrangement 1 is free of any roller bearings and is only supported indirectly via the connection of the planetary carriers and sun gears to the housing 10 or to other components of the arrangement or the arrangement environment.

FIG. 2 shows an electric machine arrangement 1 according to the disclosure in an embodiment in which the ring gear 500 of the transmission arrangement 5 is supported against the surrounding housing 10 via a radial roller bearing 11.

The figure also shows that the common ring gear 500 is supported against the housing 10 or a housing part of the electric machine 2 or the electric machine arrangement 1 via a radial roller bearing 11 and/or an axial roller bearing 12.

FIG. 3 shows an electric machine arrangement 1 according to the disclosure in an embodiment in which the ring gear 500 of the transmission arrangement 5 is supported against the surrounding housing 10 via two axial roller bearings 11 arranged at the axial ends of the ring gear 500.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SIGNS

1 Electric machine arrangement
2 Machine
3 Stator
4 Rotor
41 Receiving space
5 Transmission arrangement
51 First sub-transmission
52 Second sub-transmission
500 Ring gear
510 Set of planetary gears (first sub-transmission)
511 Sun gear (first sub-transmission)
520 First set of planetary gears (second sub-transmission)
521 Second set of planetary gears (second sub-transmission)
523 planetary carrier
522 Sun gear (second sub-transmission)
6 First output shaft
7 Second output shaft
8 First drive wheel (vehicle)
9 Second drive wheel (vehicle)
10 Housing
11 Radial roller bearing
12 Axial roller bearing
100 Further first planetary transmission
200 Further second planetary transmission

The invention claimed is:

1. An electric machine arrangement, comprising:
an electric machine having a stator and having a rotor, and a transmission arrangement driven via the rotor, wherein the transmission arrangement is arranged at least in regions in a receiving space formed within the rotor, wherein the transmission arrangement has a first sub-transmission configured as a reducing stage for reducing a rotational speed of the rotor and a second sub-transmission configured as a differential transmission, wherein the first sub-transmission is configured as a planetary transmission, wherein the second sub-transmission configured as the differential transmission is a planetary transmission and the first sub-transmission and the second sub-transmission have a common ring gear;
wherein the second sub-transmission as the differential transmission has, in addition to the common ring gear, a first set of planetary gears, a second set of planetary gears, and a sun gear that is connected in a rotationally fixed manner to a first output shaft.

2. The electric machine arrangement according to claim 1, wherein the ring gear is formed in one piece and monolithically.

3. The electric machine arrangement according to claim 1, wherein the first sub-transmission configured as the reducing stage has, in addition to the common ring gear, a set of planetary gears, and a sun gear that is connected in a rotationally fixed manner to the rotor.

4. The electric machine arrangement according to claim 1, wherein the first set of planetary gears and the second set of planetary gears have a common planetary carrier, wherein the common planetary carrier is connected in a rotationally fixed manner to a second output shaft.

5. The electric machine arrangement according to claim 4, wherein the first output shaft is connected via a further first planetary transmission to a drive shaft of a first drive wheel and the second output shaft is connected via a further second planetary transmission to a drive shaft of a second drive wheel of a motor vehicle.

6. The electric machine arrangement according to claim 1, wherein the common ring gear is supported via at least one of a radial roller bearing or an axial roller bearing against a housing or a housing part of the electric machine or the electric machine arrangement.

7. The electric machine arrangement according to claim 1, wherein the common ring gear is arranged without direct support with respect to a housing or a housing part.

8. A vehicle axle for a motor vehicle, the vehicle axle having an electric machine arrangement comprising:
an electric machine having a stator and having a rotor, and a transmission arrangement which can be driven via the rotor, wherein the transmission arrangement is arranged at least in regions in a receiving space formed within the rotor, wherein the transmission arrangement has a first sub-transmission configured as a reducing stage for reducing a rotational speed of the rotor and a second sub-transmission configured as a differential transmission, wherein the first sub-transmission is configured as a planetary transmission, wherein the second sub-transmission configured as the differential transmission is a planetary transmission and the first sub-transmission and the second sub-transmission have a common ring gear;
wherein the second sub-transmission configured as the differential transmission has, in addition to the common ring gear, a first set of planetary gears, a second set of planetary gears, and a sun gear that is connected in a rotationally fixed manner to a first output shaft.

9. The vehicle axle according to claim 8, wherein the ring gear is formed in one piece and monolithically.

10. The vehicle axle according to claim 8, wherein the first sub-transmission configured as the reducing stage has, in addition to the common ring gear, a set of planetary gears, and a sun gear that is connected in a rotationally fixed manner to the rotor.

11. The vehicle axle according to claim 8, wherein the first set of planetary gears and the second set of planetary gears have a common planetary carrier, wherein the common planetary carrier is connected in a rotationally fixed manner to a second output shaft.

12. The vehicle axle according to claim 11, wherein the first output shaft is connected via a further first planetary transmission to a drive shaft of a first drive wheel and the second output shaft is connected via a further second planetary transmission to a drive shaft of a second drive wheel of the motor vehicle.

13. The vehicle axle according to claim 8, wherein the common ring gear is supported via at least one of a radial roller bearing or an axial roller bearing against a housing or a housing part of the electric machine or the electric machine arrangement.

14. The vehicle axle according to claim 8, wherein the common ring gear is arranged without direct support with respect to a housing or a housing part.

* * * * *